United States Patent
Muto

(10) Patent No.: US 9,074,934 B2
(45) Date of Patent: Jul. 7, 2015

(54) IMAGE PROCESSING APPARATUS AND IMAGE PROCESSING METHOD

(71) Applicant: CANON KABUSHIKI KAISHA, Tokyo (JP)

(72) Inventor: Hiroyuki Muto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/682,976

(22) Filed: Nov. 21, 2012

(65) Prior Publication Data
US 2013/0155401 A1  Jun. 20, 2013

(30) Foreign Application Priority Data
Dec. 15, 2011 (JP) ................. 2011-275091

(51) Int. Cl.
G01J 3/28 (2006.01)
(52) U.S. Cl.
CPC .......................................... G01J 3/28 (2013.01)
(58) Field of Classification Search
CPC ........................................................ G01J 3/28
USPC .......... 348/241; 356/300, 302–305, 319–325; 382/275
See application file for complete search history.

(56) References Cited

U.S. PATENT DOCUMENTS 6,643,011 B2 * 11/2003 Kojima .......................... 356/300
2008/0259318 A1 * 10/2008 Pan et al. ........................ 356/73

FOREIGN PATENT DOCUMENTS

JP            11-30552 A        2/1999

* cited by examiner

Primary Examiner — Paul Berardesca
(74) Attorney, Agent, or Firm — Fitzpatrick, Cella, Harper & Scinto

(57) ABSTRACT

The present invention enables high-speed and high-precision correction of a ghost detected in a spectrum measuring apparatus. A ghost is detected from spectrum data of reference light measured by the apparatus, and for each wavelength of input light, a light amount ratio α of the input light to the corresponding ghost, as well as a shift amount di indicative of a wavelength difference between the input light and the corresponding ghost are acquired. For each spectrum wavelength of the measured light, wavelength shifting for the corresponding shift amount di and multiplication of the light amount ratio (or intensity ratio) α are performed for estimating the ghost. By removing the estimated ghost from the measured light, it is possible to realize high-precision ghost correction with a reduced amount of calculation and a reduced amount of memory.

11 Claims, 14 Drawing Sheets

FIG. 4

| WAVELENGTH (nm) | PIXEL NUMBER 1 | PIXEL NUMBER 2 | PIXEL NUMBER 3 | • | • | • | PIXEL NUMBER 128 |
|---|---|---|---|---|---|---|---|
| | 365.12 | 368.41 | 371.25 | | | | 801.29 |

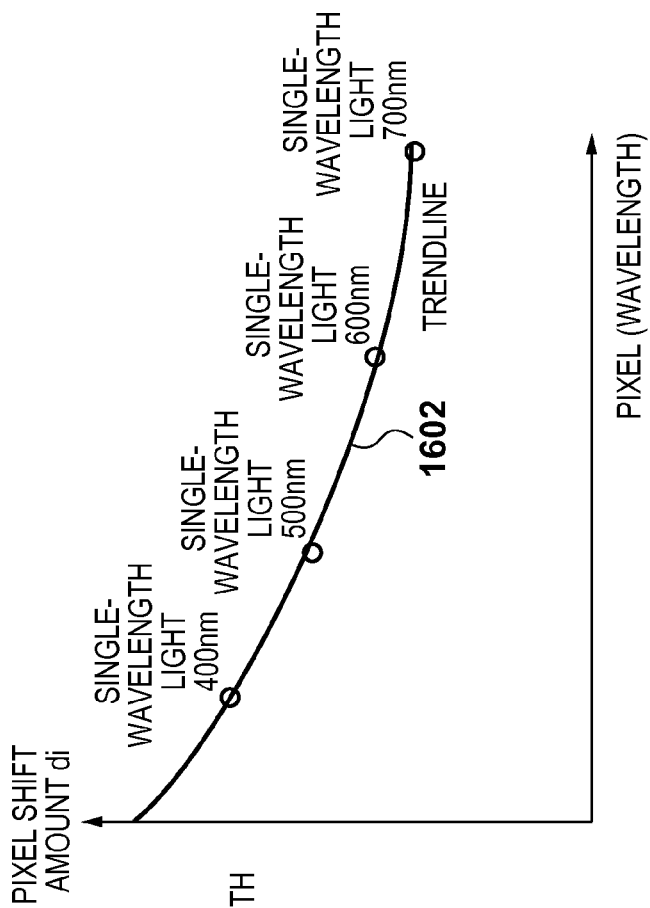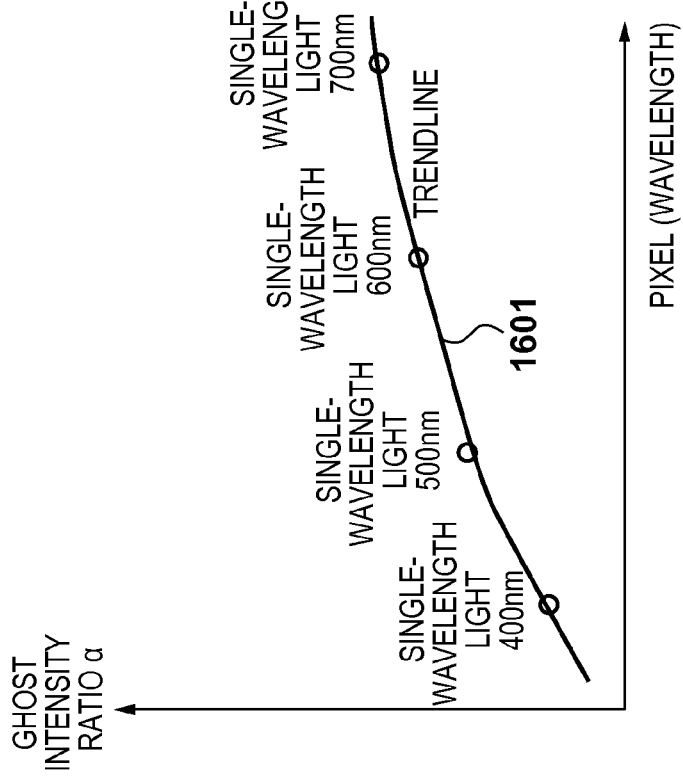
FIG. 10A
FIG. 10B

F I G. 11A

| | PIXEL NUMBER 1 | PIXEL NUMBER 2 | PIXEL NUMBER 3 | • | • | • | PIXEL NUMBER 128 |
|---|---|---|---|---|---|---|---|
| GHOST RATIO (%) | 1.1 | 1.12 | 1.13 | | | | 1.52 |
| SHIFT AMOUNT (PIXEL) | 10 | 11.3 | 12.4 | | | | 15.0 |

F I G. 11B

| | QUADRATIC FUNCTION COEFFICIENT a | QUADRATIC FUNCTION COEFFICIENT b | QUADRATIC FUNCTION COEFFICIENT c |
|---|---|---|---|
| GHOST RATIO (%) | 0.0000 | 0.015 | 1.52 |
| SHIFT AMOUNT (PIXEL) | 0.0002 | 0.03 | 15.2 |

FIG. 16

| GHOST COMPONENT AMOUNT (dec) | PIXEL NUMBER 1 | PIXEL NUMBER 2 | PIXEL NUMBER 3 | • | • | • | PIXEL NUMBER 128 |
|---|---|---|---|---|---|---|---|
| | 0 | 5 | 12 | | | | 2 |

IMAGE PROCESSING APPARATUS AND IMAGE PROCESSING METHOD

BACKGROUND OF THE INVENTION

1. Field of the Invention

The present invention relates to an image processing apparatus and an image processing method for correcting stray light components detected by an image sensor when spectrum measurement is performed.

2. Description of the Related Art

FIG. 1 is a block diagram showing a configuration of a general spectrum measuring apparatus comprising a diffraction grating and an image sensor. Conventionally, in a spectrum measuring apparatus having such a configuration, it has been known that stray light components (hereinafter referred to as ghosts) other than measurement-target light are detected by the image sensor and that ghosts cause negative effects on precision in the measurement. Ghosts are caused by various factors, such as internal reflection in the housing unit of the spectrum measuring apparatus, surface reflection in the optical lens, reflection in the image sensor, and optical characteristics of the diffraction grating. FIGS. 2A and 2B exemplify cases where ghosts are caused by multiple reflection in the image sensor. FIG. 2A exemplifies a case in which, in measurement of single-wavelength light, a ghost is detected in a position shifted from a regular detection position of measurement-target light because of multiple reflection in the image sensor. FIG. 2B exemplifies a case in which, when an actual measurement sample (hereinafter referred to as a patch) is measured, a signal including a ghost superimposed on the measurement-target light is outputted by the image sensor.

In order to reduce such ghosts, various measures have conventionally been taken. In general, the mechanical system and the optical system of a spectrum measuring apparatus are configured in a way that stray light caused in the apparatus does not enter the image sensor. Furthermore, a technique of removing ghosts by signal processing, without changing the mechanical system and the optical system, is also known. For instance, according to the technique disclosed in Japanese Patent Laid-Open No. 11-30552, a sensor output distribution, which is acquired when single-wavelength light enters a spectrum measuring apparatus, is obtained as a ghost distribution of the single-wavelength light and stored as matrix data. Based on the matrix data and a spectrum distribution of measurement-target light that is acquired by actual patch measurement, a ghost distribution of the measurement-target light is estimated by calculation, such as convolution, and ghost correction is performed.

However, according to the ghost correction method disclosed in Japanese Patent Laid-Open No. 11-30552, a large amount of memory is necessary for holding a large amount of matrix data indicative of ghost distributions. Furthermore, each time patch measurement is performed, it is necessary to convolve each pixel output of the image sensor with the aforementioned matrix data, and a considerable amount of calculation ensues, resulting in equivalent processing speed.

SUMMARY OF THE INVENTION

The present invention has been made to solve the above-described problem. The present invention provides an image processing apparatus and an image processing method for realizing, with a simple configuration, high-speed and high-precision correction of stray light components detected in a spectrum measuring apparatus.

In order to solve the above problems, according to an aspect of the disclosure, there is provided an image processing apparatus comprising: a holding unit configured to hold a correction parameter indicative of a corresponding relation between input light and a stray light component thereof in a spectrum measuring apparatus; an acquisition unit configured to acquire measured spectrum data, which has been acquired by measuring a sample by the spectrum measuring apparatus; an estimation unit configured to estimate a stray light component included in the measured spectrum data, using the correction parameter; and a correction unit configured to remove the estimated stray light component from the measured spectrum data, wherein the correction parameter includes, for each spectrum wavelength, ratio information indicative of a light amount ratio or intensity ratio of the input light to the stray light component, and shift information indicative of a wavelength difference between the input light and the stray light component.

According to the present invention, it is possible to realize, with a simple configuration, high-speed and high-precision correction of stray light components detected in a spectrum measuring apparatus.

Further features of the present invention will become apparent from the following description of exemplary embodiments with reference to the attached drawings.

BRIEF DESCRIPTION OF THE DRAWINGS

FIG. 4 is an exemplified table holding corresponding relations between a wavelength of measured light and an image sensor pixel according to the first embodiment;

FIGS. 10A and 10B are exemplified views of a trendline of a ghost light amount ratio and a shift amount according to the first embodiment;

FIGS. 11A and 11B are exemplified correction parameter storage tables according to the first embodiment;

FIG. 16 is a table showing corresponding relations between an image sensor pixel and a second ghost according to the second embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described in the following embodiments are necessarily required with respect to the means to solve the problems according to the present invention.

<First Embodiment>

The first embodiment describes an image processing apparatus for removing a stray light component (hereinafter referred to as a ghost), which is not by nature supposed to be detected, from spectrum data measured in a spectrum measuring apparatus that emits light from a light source to a sample for measuring light reflected by the sample. More specifically, the image processing apparatus according to the present embodiment holds correction parameters in advance, indicative of corresponding relations between inputted light and ghosts in the spectrum measuring apparatus. The image processing apparatus estimates, with the use of the correction parameters, a ghost included in the measured spectrum data, which is acquired by the spectrum measuring apparatus that measures the sample, and removes the estimated ghost from the measured spectrum data. Note that the correction parameters include, for each spectrum wavelength, ratio information indicative of a light amount ratio or intensity ratio of inputted light to a stray light component, and shift information indicative of a wavelength difference between inputted light and a stray light component.

Note that the first embodiment exemplifies correction of a stray light component (ghost), which is detected in a position shifted from the regular position of measurement-target light because of, in particular, multiple reflection or the like in the image sensor of the spectrum measuring apparatus.

Configuration and Operation of Spectrum Measuring Apparatus

First, a configuration and operation of a spectrum measuring apparatus according to the first embodiment is described with reference to FIG. 3. The spectrum measuring apparatus according to the present embodiment comprises a Rowland optical system formed with a combination of a concave diffraction grating and an image sensor (line sensor). Note that although the spectrum measuring apparatus has various functional parts, configurations that are not involved directly with the present embodiment will not be described herein.

Figure 1:
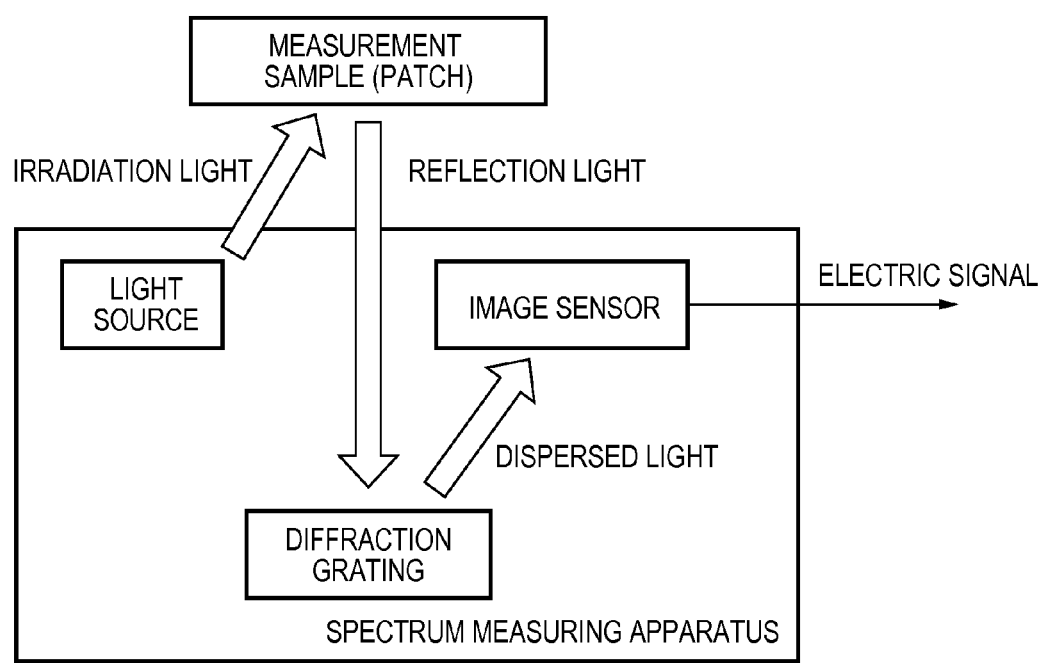
FIG. 1 is a block diagram showing a configuration of a general spectrum measuring apparatus.
Figure 2:
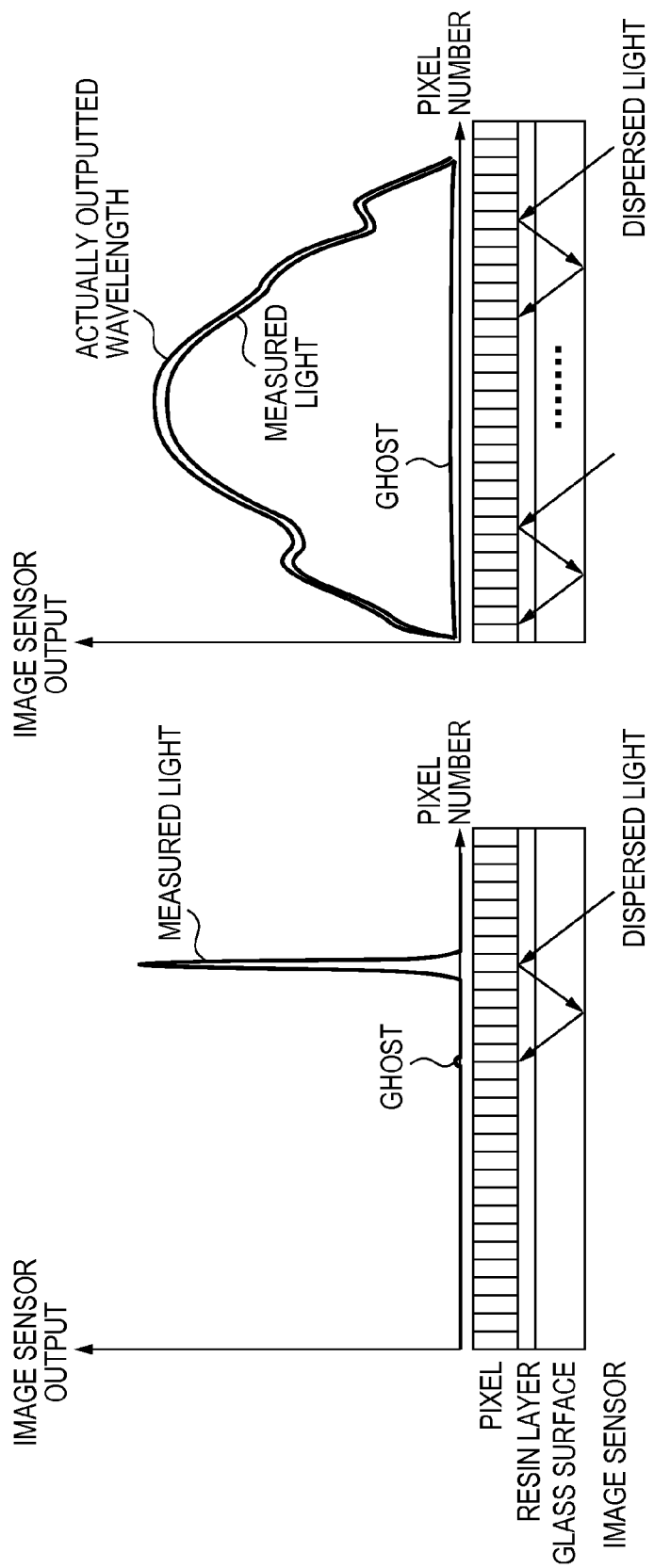
FIGS. 2A and 2B are exemplified diagrams showing ghosts detected by a spectrum measuring apparatus.
Figure 3:
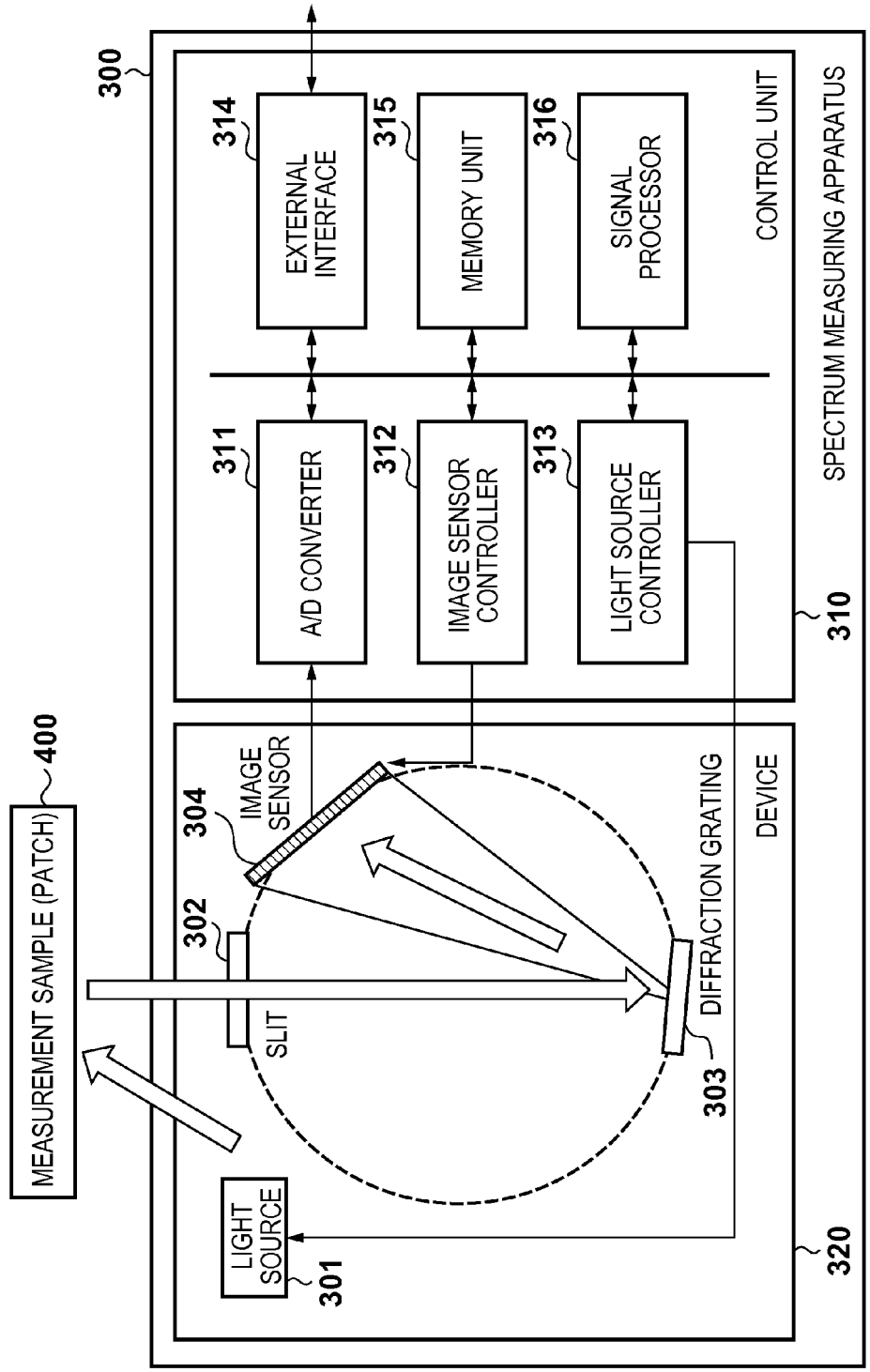
FIG. 3 is a block diagram showing a configuration of a spectrum measuring apparatus according to a first embodiment.

As shown in FIG. 3, a spectrum measuring apparatus 300 for measuring a sample (hereinafter referred to as a patch) 400 comprises a device unit 320 for sensing an image, and a control unit 310 for performing ghost correction on a signal acquired as an image-sensing result. In the device unit 320, reflection light of the patch 400, which is irradiated by a light source 301, passes through a slit 302 and enters a concave diffraction grating 303. The incident light of the concave diffraction grating 303 disperses and reflects, and the reflected light forms an image on a circle (Rowland circle), whose diameter is equal to a curvature radius of the concave diffraction grating 303. By acquiring the intensity of the dispersed light as a pixel output value using an image sensor (line sensor) 304, which is arranged on the image-forming position, spectrum information of the incident light is measured. In this stage, a ghost is caused by multiple reflection in the image sensor 304 or optical characteristics of the concave diffraction grating 303, and a signal of incident light, on which the ghost is superimposed, is outputted from the image sensor 304 and inputted to an A/D converter 311 of the control unit 310.

In the control unit 310, a light source controller 313 controls a light amount, light emission timing, and light emission time of the light source 301. An image sensor controller 312 controls operation of the image sensor 304. The A/D converter 311 converts analog signals, acquired (sensed) by the image sensor 304 using the image sensor controller 312, to digital signals (A/D conversion). A signal processor 316 performs various conversion and correction processes on the A/D-converted spectrum information. Details thereof will be described later. A memory unit 315 holds A/D-converted spectrum information acquired from the image sensor 304, data converted or corrected by the signal processor 316, parameters used in processing of the signal processor 316, and the like. For instance, in the spectrum measuring apparatus according to the present embodiment, in order to acquire spectrum information of incident light, each pixel of the image sensor 304 corresponds to a wavelength of the incident light. Therefore, the memory unit 315 holds a table or the like indicative of corresponding relations between a pixel number of the image sensor 304 and a wavelength of incident light, as shown in FIG. 4. An external interface 314 outputs digital signals or the like processed by the signal processor 316, or inputs signals from an external unit.

Figure 5:
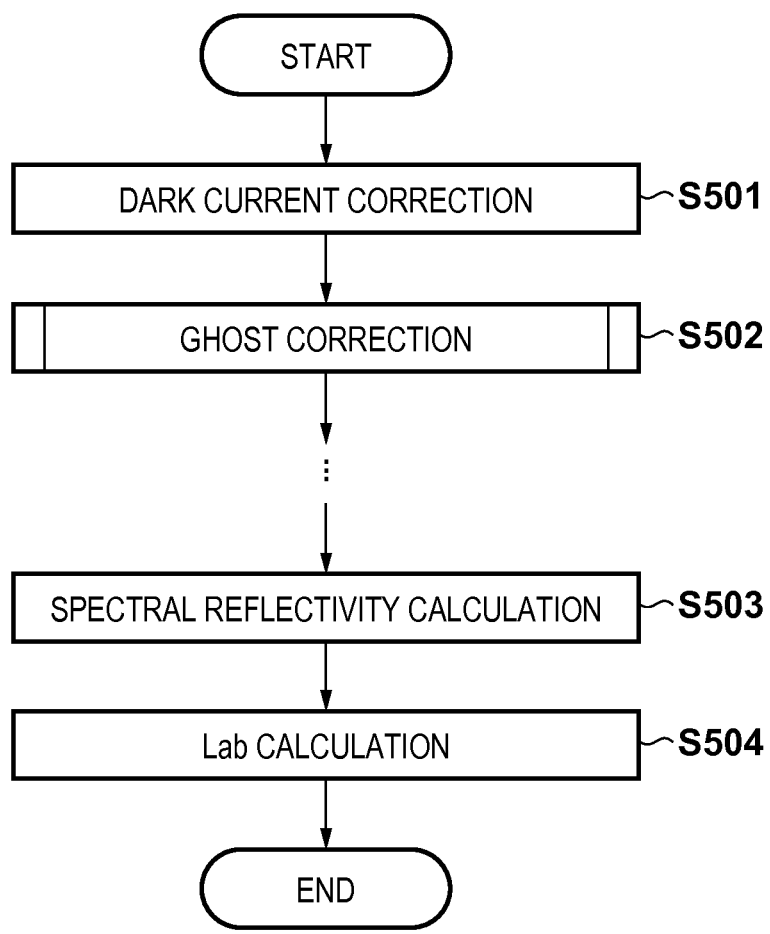
FIG. 5 is a flowchart showing processing of a signal processor according to the first embodiment.

FIG. 5 shows a flowchart of brief processing in the signal processor 316. In the signal processor 316, in S501, dark current correction for correcting a dark current, which is generated independent of incident light, is performed on spectrum information inputted from the A/D converter 311. In S502, ghost correction, which is the feature of the present embodiment, is performed. In S503, a spectral reflectivity is calculated. In S504, chromaticity CIE L*a*b* is calculated based on the spectral reflectivity.

Description of Ghost Equation Model and Derivation of Correction Equation

Hereinafter, an equation model of a ghost detected in the present embodiment is constructed, and a correction equation used in the ghost correction of the present embodiment is derived based on the ghost equation model.

A spectrum wavelength component of incident light, which corresponds to a pixel position i of the image sensor 304, is defined as T(i), a sensor output component is defined as Q(i), and a ghost (stray light component) is defined as G(i). The sensor output component Q(i) equals to a summation of the spectrum wavelength component T(i) and the ghost G(i). Assuming that the ghost G(i) is proportional to an intensity of the spectrum wavelength component T(i+di) on a position shifted for di from the pixel position i, the ghost G(i) can be expressed by Equation (1). Note that in Equation (1), α indicates a ghost ratio (ratio information of input light to a ghost), i indicates a pixel number, and di indicates a pixel shift amount.

$$Q(i)=T(i)+G(i)=T(i)+\alpha(i+di)\cdot T(i+di) \quad (1)$$

In the spectrum measuring apparatus 300 according to the present embodiment, because a pixel corresponds to a wavelength as shown in FIG. 4, a pixel can be substituted with a wavelength in the above Equation (1). More specifically, Equation (1) shows an example using the pixel i and a pixel shift amount di as parameters. Instead, a wavelength λ and a wavelength shift amount dλ may be used.

Figure 6A:
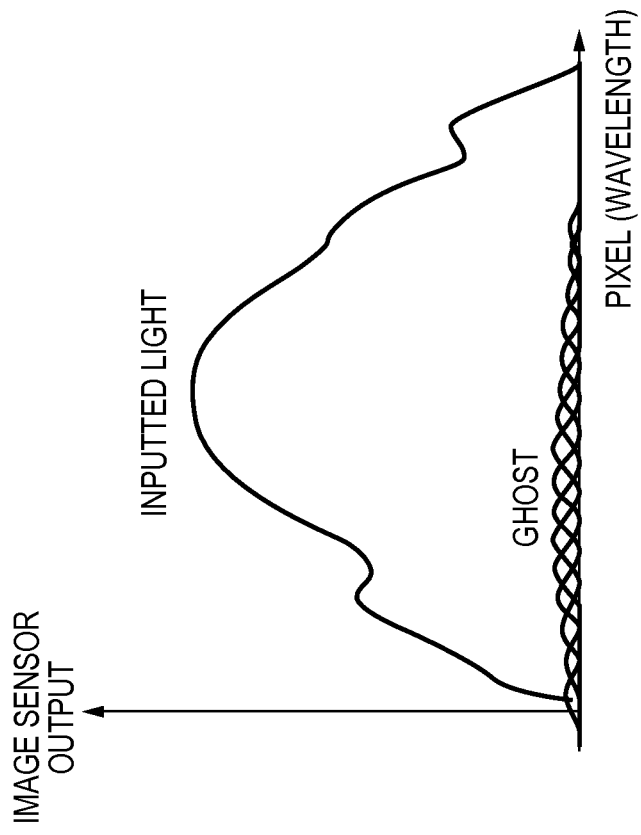
FIGS. 6A and 6B are explanatory views of a ghost equation model according to the first embodiment.
Figure 6B:
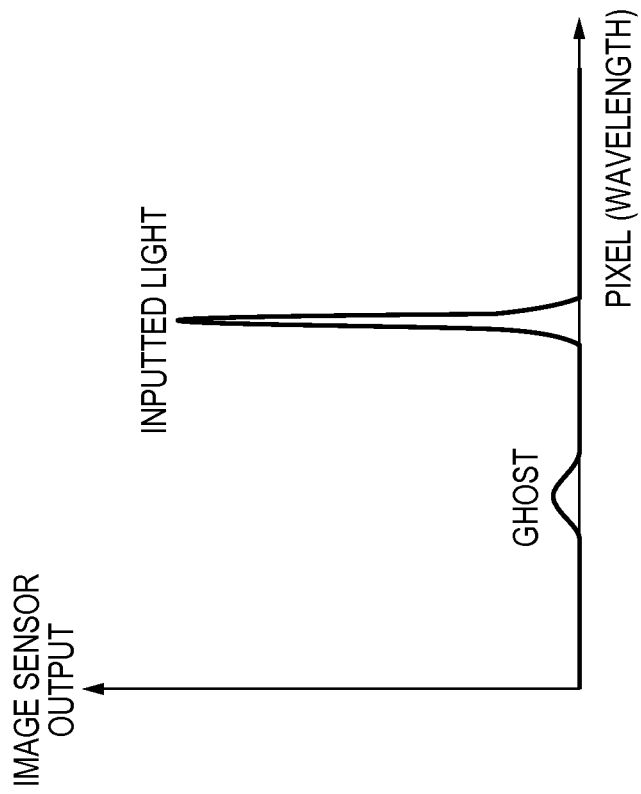

Hereinafter, details of Equation (1) are described with reference to FIGS. 6A and 6B. FIG. 6A shows an output of the image sensor 304 when single-wavelength light is inputted to the device unit 320. FIG. 6B shows an output of the image sensor 304 when continuous-wavelength light is inputted to the device unit 320.

When single-wavelength light is measured, a ghost having a broad width is caused in the position shifted from the spectrum wavelength that corresponds to the inputted single-wavelength light, as shown in FIG. 6A. When continuous-wavelength light is measured, a plurality of ghosts, each having a broad width, are caused in the positions shifted from the light having a plurality of wavelengths as shown in FIG. 6B, and the summation thereof is detected by the image sensor 304. In this case, a ghost of the pixel position i is an integrated result of the ghosts of light having a plurality of wavelengths around the shifted position (i+di). The integrated result is thought to be approximated by an integrated value of the ghosts, which are caused when single-wavelength light of the shifted position (i+di) is inputted. Therefore, the ghost ratio α can be provided as a light amount ratio (area ratio) of incident light to a ghost (stray light component).

When i+di is inserted to i in Equation (1), following Equation (2) is obtained.

$$Q(i+di)=T(i+di)+\alpha(i+2di)\cdot T(i+2di) \quad (2)$$

By modifying Equation (2), following Equation (3) is obtained.

$$T(i+di)=Q(i+di)-\alpha(i+2di)\cdot T(i+2di) \quad (3)$$

When Equation (3) is inserted to Equation (1), following Equation (4) is obtained.

$$Q(i)=T(i)+\alpha(i+di)\cdot Q(i+di)-\alpha(i+di)\cdot\alpha(i+2di)\cdot T(i+2di) \quad (4)$$

By repeating the operation of above Equations (2) to (4), following Equation (5) is obtained.

$$Q(i) = T(i) + \alpha(i+di)\cdot Q(i+di) - \alpha(i+di)\cdot\alpha(i+2di)\cdot Q(i+2di) + \\ \alpha(i+di)\cdot\alpha(i+2di)\cdot\alpha(i+3di)\cdot T(i+3di) + \ldots \quad (5)$$

Herein, assuming that a ghost ratio of an actually detected level is α≈1%, terms following the second term α(i+di)·α(i+2di)·Q(i+2di) on the right-hand side of Equation (5) has an influence of 0.01% or less. Therefore, because an influence on the spectrum wavelength component T(i) is extremely small, the terms following the second term on the right-hand side of Equation (5) can be regarded as being negligible. Accordingly, following Equation (6) can be obtained from Equation (5).

$$T(i)=Q(i)-\alpha(i+di)\cdot Q(i+di) \quad (6)$$

According to Equation (6), the spectrum wavelength component T(i), from which a ghost is removed, can be derived based on the sensor output Q(i) and the ghost correction parameters (ghost ratio α and shift amount di). In other words, Equation (6) is the ghost correction equation used in the present embodiment.

Correction Parameter Acquisition Processing

Hereinafter, acquisition processing of correction parameters (α, di) according to the present embodiment is described with reference to the flowchart in FIG. 7. This processing is executed at the time of manufacturing the spectrum measuring apparatus 300, and the acquired correction parameters are held in the memory unit 315.

In S701, the spectrum measuring apparatus 300 measures light from a reference light source prepared in advance, and acquires spectrum data of the reference light. In this stage, the light source 301 is set to be turned off (light off) by the light source controller 313, so that only the reference light is inputted to the spectrum measuring apparatus 300 through the slit 302. Shown in FIGS. 8A to 8D are exemplified spectrum data of the reference light (single-wavelength light) measured in S701. As shown in FIGS. 8A to 8D, by using the light having a plurality of wavelengths, e.g., 400 nm, 500 nm, 600 nm and 700 nm as reference light, spectrum data shown in FIGS. 8A to 8D are acquired. As is apparent from FIGS. 8A to 8D, by measuring the reference light, it is possible to separately acquire spectrum data of the reference light and a ghost, which is caused when the reference light enters. Note in the spectrum measuring apparatus 300 according to the present embodiment, in order to correlate each pixel of the image sensor 304 with the wavelength of the detected light, measurement of single-wavelength light as shown in FIGS. 8A to 8D is performed at the time of manufacturing the apparatus, and corresponding relations between the sensor pixels and the detected wavelengths as shown in FIG. 4 are calculated. This operation is referred to as wavelength calibration operation. Accordingly, the reference light measuring processing in S701 can be realized in common measurement processing of the wavelength calibration operation; and therefore, further measurement is unnecessary.

In S702, information regarding a ghost ratio and a shift amount are calculated as correction parameters based on the spectrum data (reference light and a ghost thereof) acquired in S701. By executing the correction parameter calculation with respect to all the reference light measured in S701, a ghost ratio and a shift amount corresponding to all the reference light are calculated.

The ghost ratio, which is a light amount ratio of measured light (reference light) to a ghost with respect to the spectrum data acquired in S701, is calculated from an integrated value of pixel outputs of the image sensor 304. For instance, in the spectrum data in FIG. 9, light amount ratio B/A of input light A to ghost B=integrated value of ghosts/integrated value of input light=1.34%. In the present embodiment, the light amount ratio is adopted as a ghost ratio.

Figure 9:
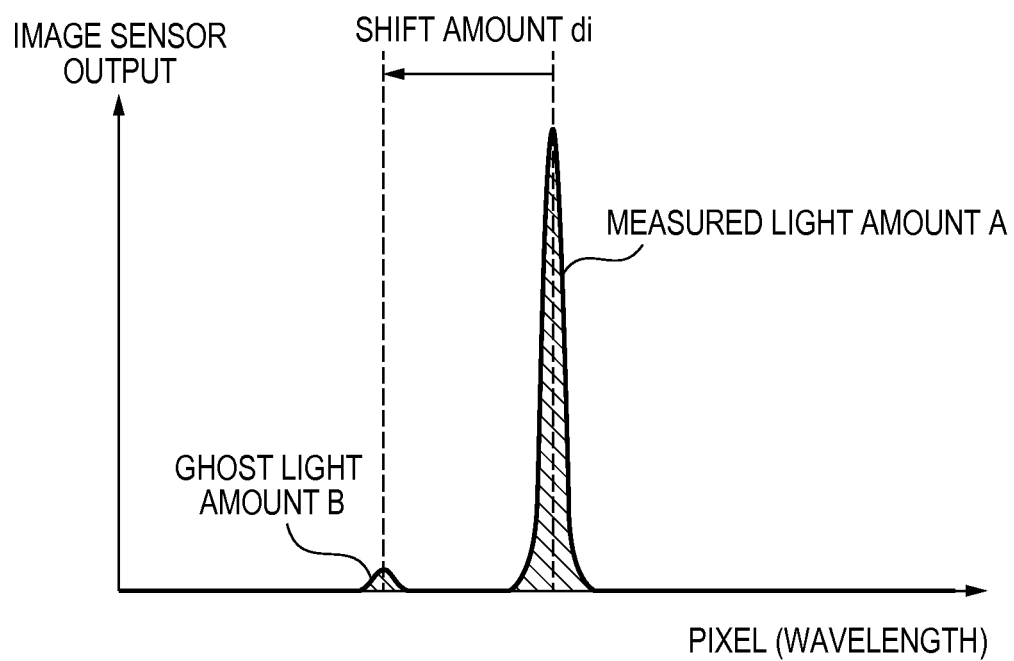
FIG. 9 is an explanatory view of a ghost light amount ratio and a shift amount according to the first embodiment.

For a shift amount, as shown in FIG. 9, a shift amount (e.g., 32-pixel shift or 91 nm-wavelength shift) indicative of the difference between a pixel position (wavelength) of measured light and a pixel position (wavelength) of a ghost is calculated based on the spectrum data acquired in S701. For a shift amount calculation method, calculation based on a shift amount of waveform peaks of the measured light and a ghost, or calculation based on a shift amount of the centroid of waveforms, or the like may be used. When a shift amount is calculated based on a shift amount of waveform peaks, a peak may be calculated based on function fitting, or a maximum value may be used as a peak value.

In S703, interpolation calculation is performed on the correction parameters, indicative of a ghost ratio and a shift amount corresponding to the measured light acquired in S702, for calculating a ghost ratio and a shift amount corresponding to an arbitrary spectrum wavelength. More specifically, function fitting is performed on the correction parameters (ghost ratio and shift amount) corresponding to the measured light for calculating a polynomial trendline. FIGS. 10A and 10B show exemplified polynomial trendlines calculated in a case of using the reference light shown in FIGS. 8A to 8D. FIG. 10A shows a trendline 1601 of a ghost ratio, and FIG. 10B shows a trendline 1602 of a pixel shift amount. From the trendlines, corresponding relations between an intensity ratio of arbitrary input light to a ghost and a ghost shift amount can be calculated. FIGS. 11A and 11B show exemplified tables indicative of corresponding relations of the input light and the correction parameters (ghost intensity ratio and shift amount) that are calculated in S703. FIG. 11A is a table indicative of corresponding relations among a pixel number of input light, a ghost ratio, and a pixel shift amount. FIG. 11B is a table indicative of coefficients of trendlines representing corresponding relations among a pixel number of input light, a ghost ratio, and a pixel shift amount. In other words, the correction-parameter corresponding table may be generated in either form of FIG. 11A or 11B. Note that, in the spectrum measuring apparatus 300 according to the present embodiment, because each pixel corresponds to a wavelength as shown in FIG. 4, "pixel number" and "shift amount (pixel)" in FIGS. 11A and 11B may be substituted with "wavelength" and "shift amount (wavelength)" respectively. In other words, the aforementioned ghost ratio and shift amount are different values for each pixel (wavelength), and more specifically, the values are functions of input light wavelengths.

Note that calculation processing in S702 and S703 may be realized by transferring the acquired spectrum data to an external PC through the external interface 314 for calculation by the external PC.

Next, in S704, the correction parameters acquired by the interpolation calculation in S703, in other words, the corresponding relations (table) among arbitrary input light, a ghost intensity ratio, and a ghost shift amount, are written in the memory unit 315. The spectrum measuring apparatus 300 is shipped as a product in the state in which the correction parameters are stored in the memory unit 315. Note that it is preferable to perform the calculation and storage of correction parameters at a predetermined timing, even after the products are shipped. Note, in this case, the memory unit 315 is configured with a rewritable non-volatile memory (e.g., EEPROM or flash memory).

Figure 12:
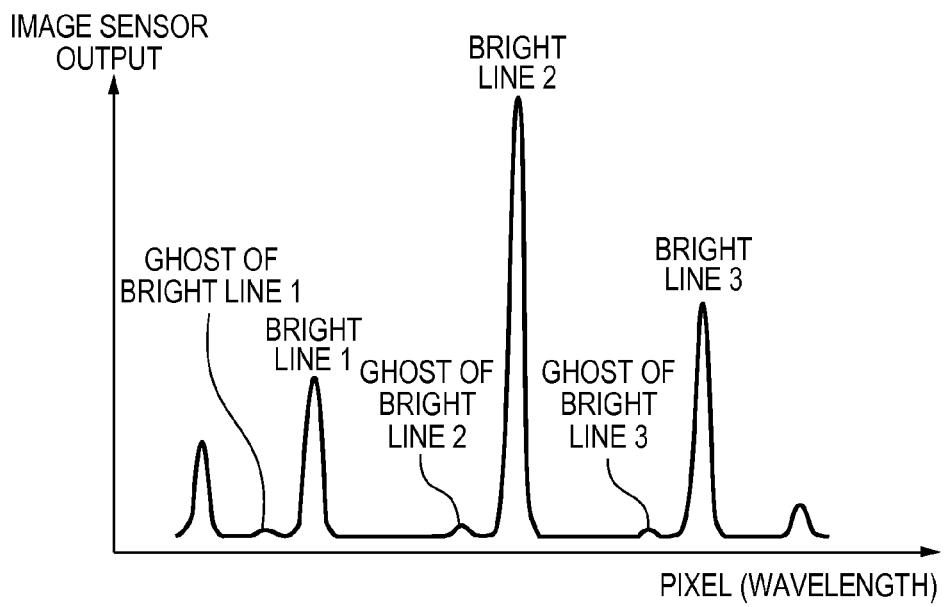
FIG. 12 is a graph exemplifying an image sensor output waveform, obtained by measuring reference light having a plurality of brightline spectra according to the first embodiment.

For the reference light as a measurement target in S701, although the above embodiment has provided an example of using a plurality of monochromatic light as shown in FIGS. 8A to 8D, light having a plurality of brightline spectra (bright lines 1, 2, 3) can be adopted as reference light. In this case, ghosts of the plurality of bright lines 1 to 3 can simultaneously be measured as shown in FIG. 12. Therefore, correction parameters corresponding to the plurality of bright lines 1 to 3 can be acquired simultaneously.

According to the present embodiment, with the use of correction parameters calculated in the above-described manner, it is possible to estimate a ghost corresponding to arbitrary input measurement light.

Ghost Correction Processing

Hereinafter, ghost correction processing using the correction parameters, acquired by the above-described processing, is described with reference to the flowchart in FIG. 13. In the following description, ghost correction using information regarding a ghost ratio and a shift amount is performed on color measurement data of a patch.

In the signal processor 316 of the spectrum measuring apparatus 300, various conversion and correction processing shown in the flowchart in FIG. 5 are performed on spectrum data of a patch. S502 is ghost correction processing. In the spectral reflectivity calculation processing in S503, color measurement data of a white reference plate is used. On the white reference plate data, ghost correction is also performed in the similar procedure that will be described below.

In S1201, spectrum data Q (dark-current-corrected data) of a patch measured by the spectrum measuring apparatus 300 is acquired.

In S1202, the spectrum data Q, which is acquired in S1201, is multiplied by the ghost ratio α held in the memory unit 315. The multiplied spectrum data is shown in Equation (7).

$$\alpha(i) \cdot Q(i) \quad (7)$$

In S1203, the multiplied data, calculated in S1202, is shifted to the pixel direction (wavelength direction) for the shift amount $di$ held in the memory unit 315, thereby acquiring a ghost G. This calculation is shown in Equation (8). Note that, because actual input data Q is discrete data in the shifting calculation shown in Equation (8), interpolation (linear interpolation or the like) is necessary to calculate shifted data.

$$G(i) = \alpha(i+di) \cdot Q(i+di) \quad (8)$$

Figure 14:
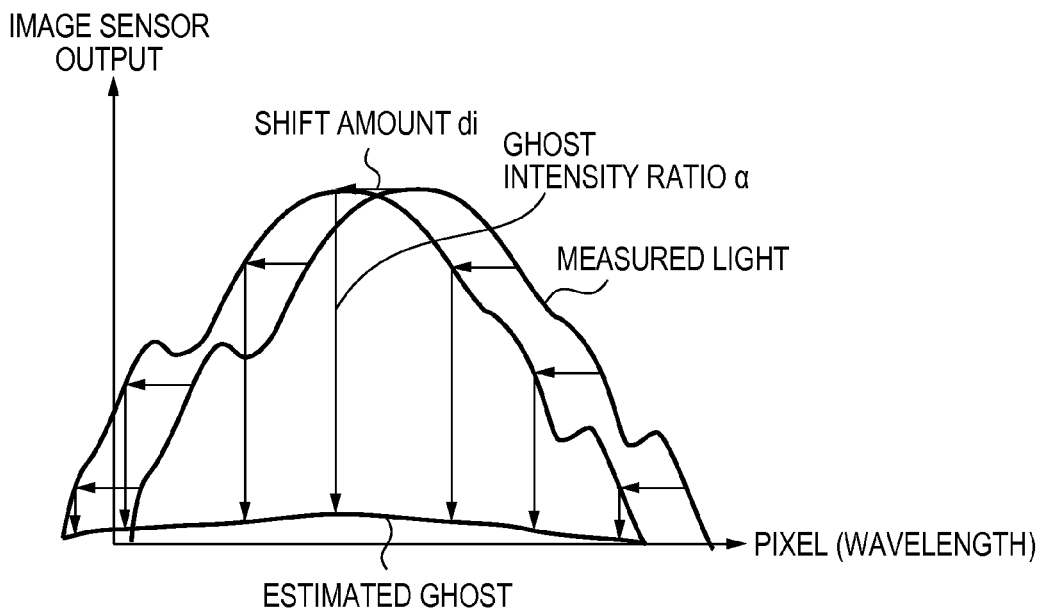
FIG. 14 is a graph showing an overview of ghost correction according to the first embodiment.

By the ghost ratio multiplication in S1202 and pixel shifting in S1203, a ghost G is estimated. The execution order of S1202 and S1203 may be reversed. FIG. 14 shows how the ghost G is estimated by Equations (7) and (8). In FIG. 14, the horizontal arrows indicate the shifting executed by Equation (8) on the measured spectrum data, and the vertical arrows indicate the ghost ratio multiplication executed by Equation (7). As is apparent from FIG. 14, a ghost can be estimated by the shifting and multiplication processing (or multiplication and shifting processing) on the measured light.

Note that, in a case where the memory unit 315 stores the trendline coefficient table shown in FIG. 11B, the above-described processing in S1202 and S1203 may be performed after a ghost ratio and a shift amount for each pixel (wavelength) are calculated as shown in FIG. 11A based on the trendline.

In S1204, the ghost G estimated in S1203 is subtracted from the original spectrum data Q (input signal), which has been inputted in S1201, as shown in Equation (9). As a result, a spectrum wavelength component T for only the patch, from which a ghost is removed, can be obtained.

$$T(i) = Q(i) - G(i) \quad (9)$$

As described above, according to the present embodiment, a ghost detected in a position shifted from the regular position of the incident light component can be removed from the spectrum data of a patch measured by the spectrum measuring apparatus 300. Therefore, unnecessary light components detected in the image sensor in spectrum measurement can be corrected, and highly precise color measurement of a patch can be performed.

Note that, although the present embodiment has adopted a light amount ratio as ratio information (ghost ratio) of incident light to a ghost, ratio information is not limited to a light amount, and it may be another index indicative of a ratio of incident light to a ghost. For instance, an intensity ratio of measured light to a waveform peak of a ghost may be used. An advantage of using the intensity ratio as a ghost ratio is as follows. More specifically, because a ghost is estimated based on a ratio of each waveform peak, excessive ghost estimation need not be a concern, and stable correction is possible. On the other hand, an advantage of using a light amount ratio is as follows. More specifically, because a ghost is estimated based on a ratio of integrated values of each waveform, even when there is a large difference in the broadening state (the way a waveform widens) of incident light and a ghost, appropriate correction is possible based on the premise that the incident light is continuous-wavelengt light. As described above, for ratio information of incident light to a ghost, an appropriate index may be selected in accordance with the characteristics (ghost characteristics, broadening characteristics and so forth) of the spectrum measuring apparatus.

<Second Embodiment>

Hereinafter, a second embodiment of the present invention is described. The foregoing first embodiment has provided an example of correcting a ghost (hereinafter referred to as the first ghost), which is caused by multiple reflection in the image sensor or optical characteristics of the diffraction grating. The second embodiment will provide an example of correcting a ghost (hereinafter referred to as the second ghost), which is caused by internal reflection in the housing unit of the spectrum measuring apparatus, in addition to the first embodiment. Note that, because the configuration of the spectrum measuring apparatus according to the second embodiment is similar to that of the first embodiment, a description thereof is omitted, and the following explanation will refer to FIG. 3.

Because the first ghost is caused by multiple reflections in the image sensor 304 or optical characteristics of the diffraction grating, the first ghost varies depending not only on the brightness of the light source 301 and the accumulation time of the image sensor 304, but also on the hue, the intensity, or the like of a patch serving as a measurement sample. On the other hand, the second ghost is caused when light from the light source 301 is reflected in the housing unit of the spectrum measuring apparatus 300 and enters in the image sensor 304. Therefore, while the second ghost varies depending on the brightness of the light source 301 and the accumulation time of the image sensor 304, it does not depend on the hue or the intensity of the measurement sample, and a constant amount of a ghost is detected. Therefore, the correction step of the second ghost can be separated from that of the first ghost that is dependent on the measurement sample, which has been corrected in the first embodiment. In other words, the second embodiment comprises two stages of ghost correction steps, wherein in the first ghost correction step, the first ghost is corrected in the similar manner to that of the first embodiment, and in the second ghost correction step, the second ghost is corrected. By virtue of performing two stages of ghost correction steps, ghosts detected by the spectrum measuring apparatus 300 can be removed with higher precision.

Configuration and Operation of Spectrum Measuring Apparatus

Figure 15:
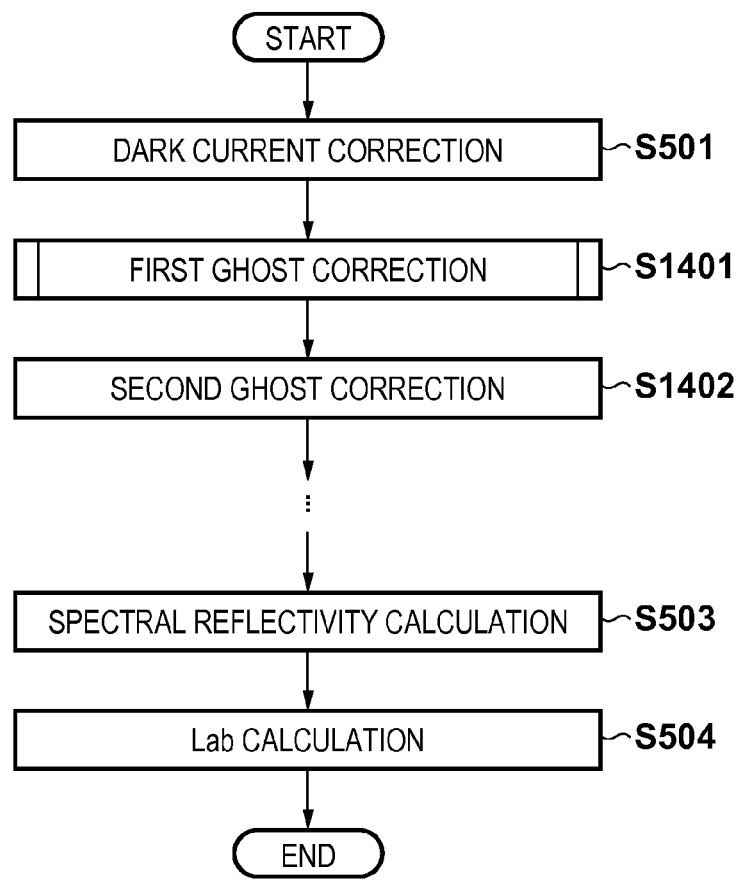
FIG. 15 is a flowchart showing processing performed in a signal processor according to the second embodiment.

As mentioned above, the configuration of the spectrum measuring apparatus 300 according to the second embodiment is similar to that of the first embodiment. FIG. 15 shows a flowchart of brief processing in the signal processor 316 according to the second embodiment. As shown in FIG. 15, the second embodiment comprises the first ghost correction step (S1401) and the second ghost correction step (S1402). In the first ghost correction step (S1401), the first correction processing is performed in the similar manner to S502 in FIG. 5 that has been described in the first embodiment. In the second ghost correction step (S1402), the second correction processing is performed according to the procedure that will be described below. Note that other steps are performed similarly to that of FIG. 5.

Description of Ghost Equation Model and Derivation of Correction Equation

A ghost correction equation according to the second embodiment is derived by Equation (10).

$$T(i)=Q(i)-\alpha(i+di)\cdot Q(i+di)-P(i) \quad (10)$$

In Equation (10), i indicates a pixel position of the image sensor 304, T(i) indicates a spectrum wavelength component of incident light, Q(i) indicates a sensor output, P(i) indicates a second ghost, $\alpha(i)$ indicates a ghost ratio, and di indicates a pixel shift amount. In Equation (10), subtraction of the second ghost P(i), caused by internal reflection in the spectrum measuring apparatus 300, is added to the ghost correction equation (6) described in the first embodiment. More specifically, in the second embodiment, the operation $(Q(i)-\alpha(i+di)\cdot Q(i+di))$ up to the second term on the right-hand side of Equation (10) is performed in the first ghost correction step, and the operation $(-P(i))$ in the third term of Equation (10) is performed in the second ghost correction step.

Correction Parameter Acquisition Processing

Hereinafter, correction parameter acquisition processing according to the second embodiment is described.

Figure 7:
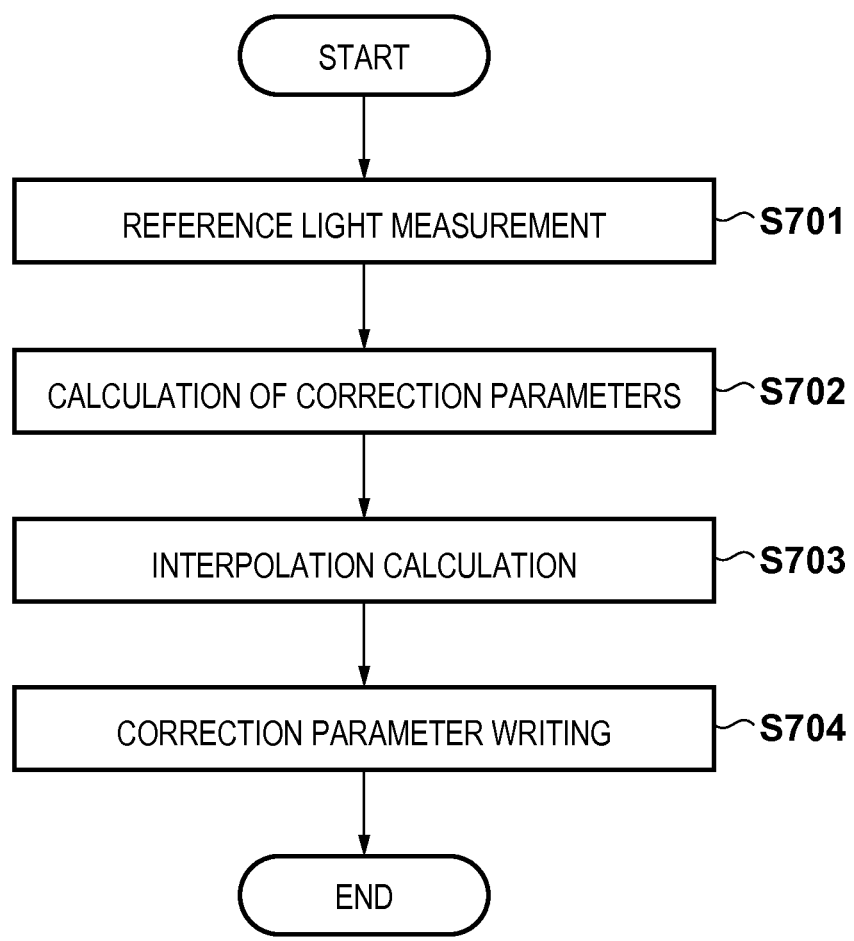
FIG. 7 is a flowchart showing correction parameter acquisition processing according to the first embodiment.
Figure 8A:
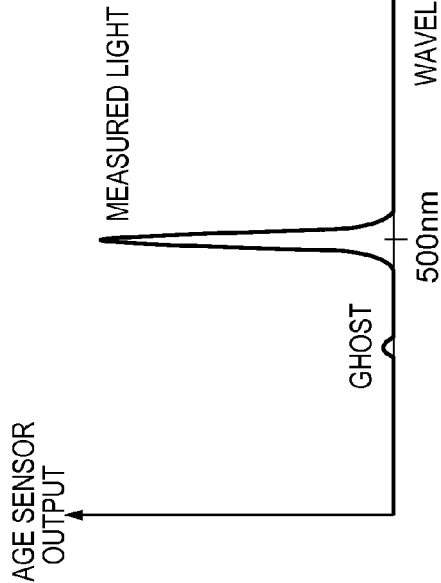
FIGS. 8A to 8D are explanatory views showing exemplified wavelengths outputted by an image sensor, acquired in reference light (single-wavelength light) measurement according to the first embodiment.
Figure 8B:
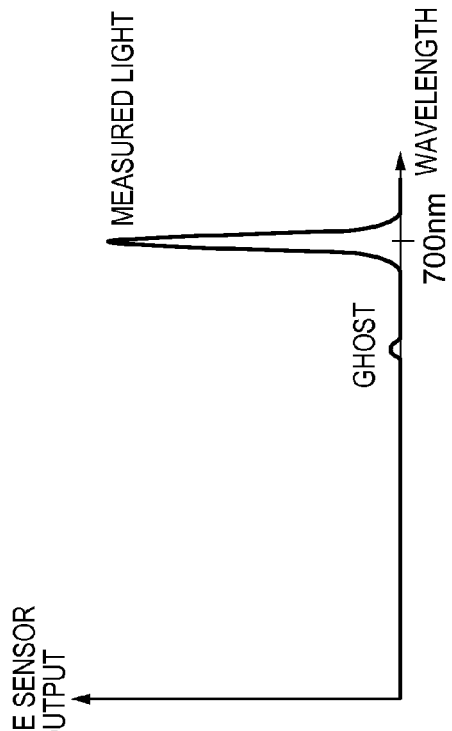
Figure 8C:
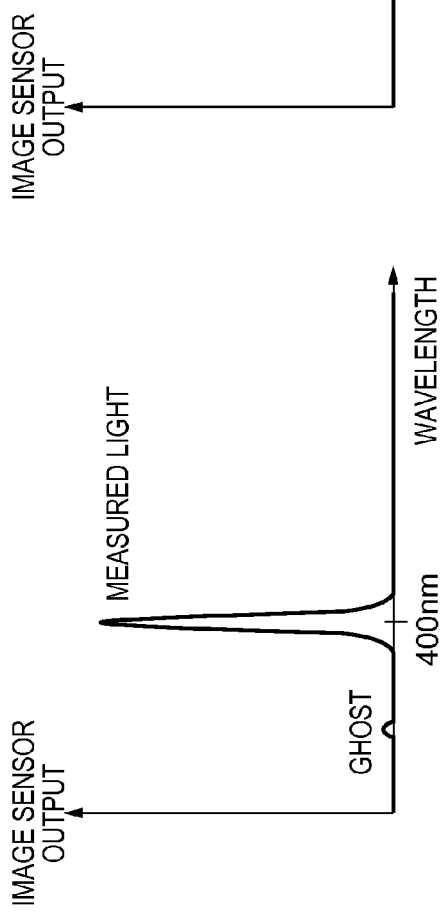
Figure 8D:
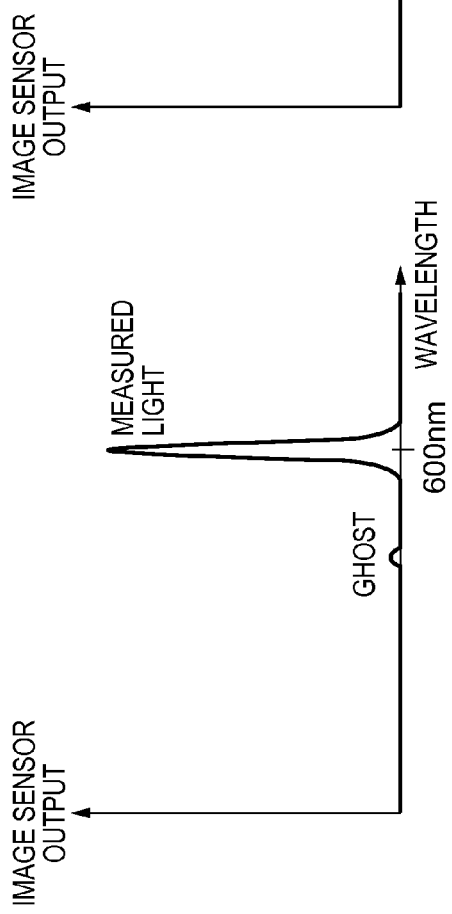

First, correction parameters $(\alpha, di)$ for the first ghost correction are calculated by the similar procedure of the flowchart in FIG. 7, which has been described in the first embodiment. More specifically, a ghost ratio $\alpha(i)$ corresponding to arbitrary incident light and a shift amount di are calculated and stored in the memory unit 315 as a correction table (first holding means).

For correction parameters of the second ghost correction, the second ghost Pi in Equation (10) is calculated. More specifically, a light trap for shielding reflection light is provided on the measurement-target surface (position of the measurement sample 400 in FIG. 3) of the spectrum measuring apparatus 300. The light trap achieves a dark state in the spectrum measuring apparatus 300 where no incident light exists. In this state, the light source 301 is turned on and an output of the image sensor 304 is acquired. As a result, spectrum data of the light that has been emitted by the light source 301 and internally reflected in the housing unit of the spectrum measuring apparatus 300 can be obtained. A value, in which a dark current component is removed from the spectrum data, is held as the second ghost in the memory unit 315 (second holding means).

FIG. 16 exemplifies the second ghost, obtained for each pixel position (wavelength) of the image sensor 304. Note that, if the spectrum measuring apparatus 300 comprises a brightness adjusting function of the light source 301, the second ghost is held in accordance with the brightness of the light source. If the spectrum measuring apparatus 300 comprises a function for adjusting accumulation time of the image sensor 304 in accordance with the patch intensity, the second ghost is held for each accumulation time.

Ghost Correction Processing

Hereinafter, ghost correction processing according to the second embodiment is described.

Figure 13:
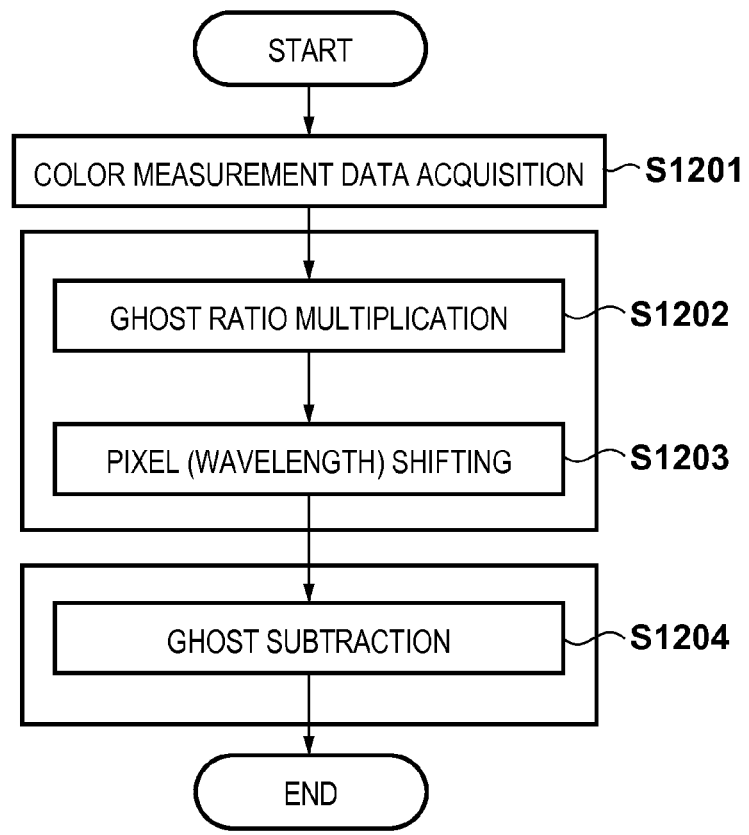
FIG. 13 is a flowchart showing ghost correction processing according to the first embodiment.

In the first ghost correction processing in S1401, measured spectrum data is multiplied by the ghost ratio, and the data obtained after the shifting is acquired as the estimated first ghost, similarly to the correction processing in FIG. 13 described in the first embodiment. The estimated first ghost is removed from the original spectrum data, thereby realizing the first ghost correction processing.

In the second ghost correction processing in S1402, the second ghost held in the memory unit 315 is subtracted from the spectrum data, whose the first ghost is corrected in S1401. As a result, second ghost correction processing is realized.

As has been described, according to the second embodiment, in addition to the first embodiment where the first ghost that is dependent on a measurement sample is corrected, the second ghost (second stray light component) that is not dependent on a measurement sample is corrected. Accordingly, it is possible to correct ghosts with high precision that are caused by various factors (optical characteristics of the diffraction grating, reflection on the image sensor surface, internal reflection in the housing unit, or the like) with respect to spectrum data measured in the spectrum measuring apparatus 300.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-275091, filed Dec. 15, 2011 which is hereby incorporated by reference herein in its entirety.

What is claimed is:

1. An image processing apparatus comprising:
a holding unit configured to hold a correction parameter indicative of a corresponding relation between input light and a stray light component thereof in a spectrum measuring apparatus;
an acquisition unit configured to acquire measured spectrum data, which has been acquired by measuring a sample by the spectrum measuring apparatus;
an estimation unit configured to estimate a stray light component included in the measured spectrum data, using the correction parameter; and
a correction unit configured to remove the estimated stray light component from the measured spectrum data,
wherein the correction parameter includes, for each spectrum wavelength, ratio information indicative of a light amount ratio or intensity ratio of the input light to the stray light component, and shift information indicative of a wavelength difference between the input light and the stray light component.

2. The image processing apparatus according to claim 1, wherein said estimation unit multiplies the measured spectrum data by the ratio information, performs wavelength shifting in accordance with the shift information, and acquires spectrum data as the estimated stray light component.

3. The image processing apparatus according to claim 1, wherein said holding unit holds the ratio information and the shift information as a function of a wavelength of the input light.

4. The image processing apparatus according to claim 1, wherein said estimation unit estimates a stray light component that varies depending on the sample.

5. The image processing apparatus according to claim 4, wherein said estimation unit estimates a stray light component caused by multiple reflection in an image sensor or an optical characteristic of a diffraction grating in the spectrum measuring apparatus.

6. The image processing apparatus according to claim 4, wherein said spectrum measuring apparatus measures spectrum data of reflection light of the sample by emitting light from a light source to the sample,
wherein said holding unit further holds a stray light component that is not dependent on the sample, detected in the spectrum data of the light source measured in the spectrum measuring apparatus, and
wherein said correction unit further removes the stray light component that is not dependent on the sample, which is detected in the spectrum data of the light source, from the measured spectrum data.

7. The image processing apparatus according to claim 6, wherein said holding unit holds a stray light component, which is caused when light from the light source is internally reflected in a housing unit of the spectrum measuring apparatus, as the stray light component that is not dependent on the sample.

8. An image processing method in an image processing apparatus, comprising the steps of:
holding a correction parameter indicative of a corresponding relation between input light and a stray light component thereof in a spectrum measuring apparatus;
acquiring measured spectrum data, which has been acquired by measuring a sample by the spectrum measuring apparatus;
estimating a stray light component included in the measured spectrum data, using the correction parameter; and
removing the estimated stray light component from the measured spectrum data,
wherein the correction parameter includes, for each spectrum wavelength, ratio information indicative of a light amount ratio or intensity ratio of the input light to the stray light component, and shift information indicative of a wavelength difference between the input light and the stray light component.

9. A non-transitory computer-readable storage medium storing a program that causes a computer apparatus to execute each step S of the method described in claim 8 by being executed by the computer apparatus.

10. An image processing apparatus comprising:
a holding unit configured to hold (1) ratio information indicative of a light amount ratio or intensity ratio of input light to a stray light component in a spectrum measuring apparatus and (2) shift information indicative of a wavelength difference between the input light and the stray light component;
an acquisition unit configured to acquire measured spectrum data, which has been acquired by measuring a sample by the spectrum measuring apparatus;
an estimation unit configured to estimate a stray light component included in the measured spectrum data, using the ratio information and the shift information; and
a correction unit configured to correct, using the estimated stray light component, the measured spectrum data.

11. An image processing method in an image processing apparatus comprising the steps of:
holding (1) ratio information indicative of a light amount ratio or intensity ratio of input light to a stray light component in a spectrum measuring apparatus and (2) shift information indicative of a wavelength difference between the input light and the stray light component;
acquiring measured spectrum data, which has been acquired by measuring a sample by the spectrum measuring apparatus;
estimating a stray light component included in the measured spectrum data, using the ratio information and the shift information; and
correcting, using the estimated stray light component, the measured spectrum data.

* * * * *